W. C. BURT.
PROTECTIVE COVERING FOR TIRES.
APPLICATION FILED AUG. 30, 1920.
1,403,385. Patented Jan. 10, 1922.
2 SHEETS—SHEET 2.
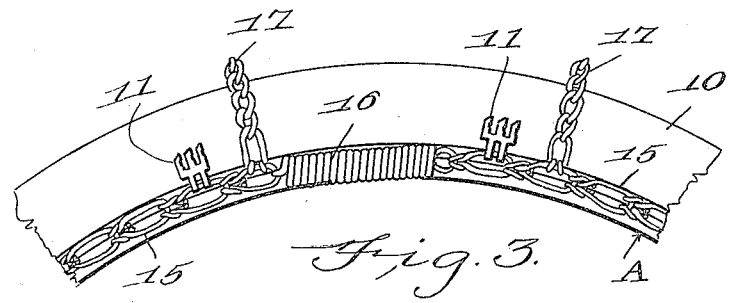
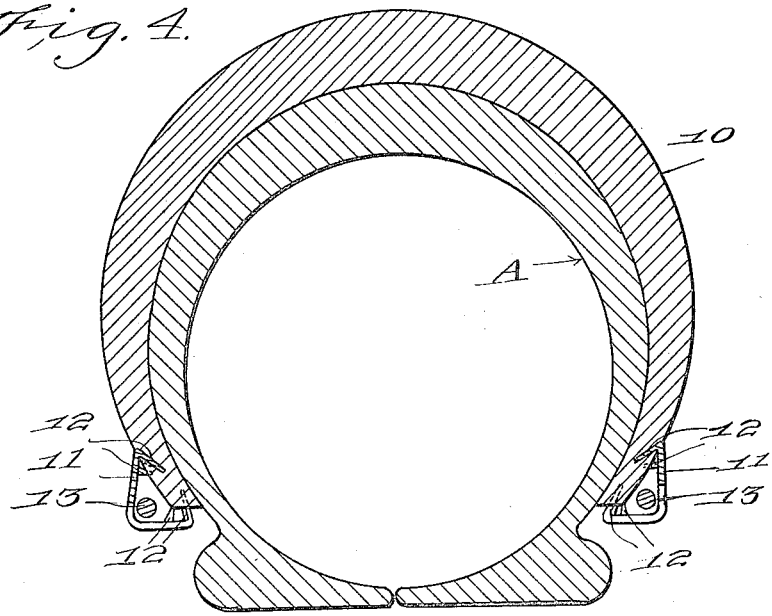
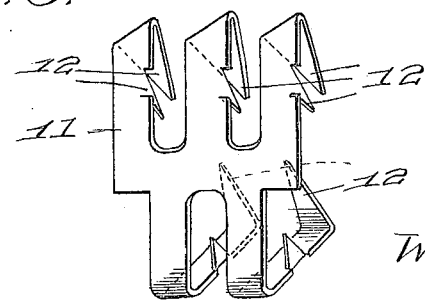
W. C. Burt,
INVENTOR
BY Victor J. Evans
ATTORNEY

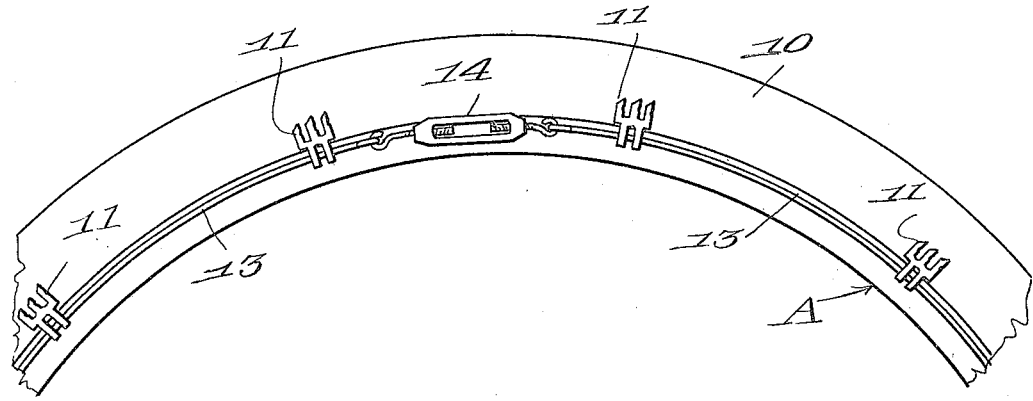
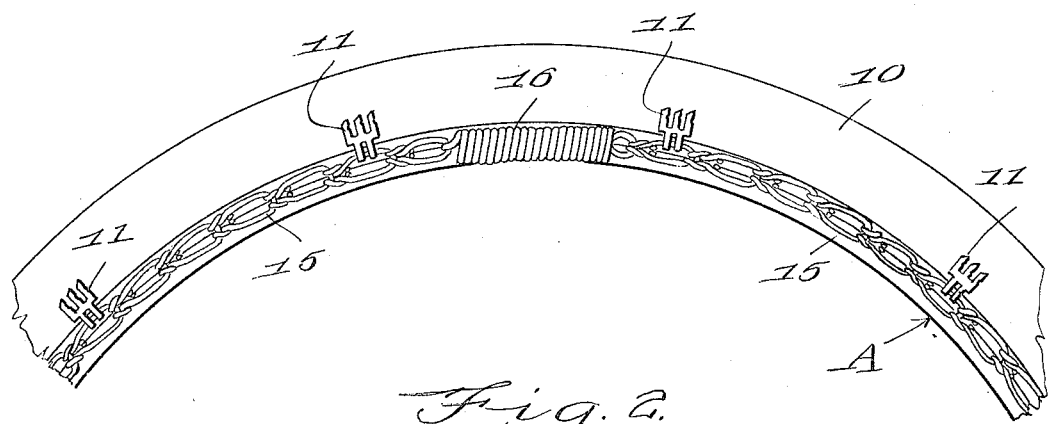

UNITED STATES PATENT OFFICE.

WILLIAM C. BURT, OF ENID, OKLAHOMA.

PROTECTIVE COVERING FOR TIRES.

1,403,385.   Specification of Letters Patent.   Patented Jan. 10, 1922.

Application filed August 30, 1920. Serial No. 406,822.

*To all whom it may concern:*

Be it known that I, WILLIAM C. BURT, a citizen of the United States, residing at Enid, in the county of Garfield and State of Oklahoma, have invented new and useful Improvements in Protective Coverings for Tires, of which the following is a specification.

This invention relates to tires, particularly to those of the pneumatic type, and has for its object the provision of a protective covering adapted for engagement upon the exterior of a pneumatic tire casing and formed of a casing which has been rim cut and which has had its beads subsequently cut off, my invention enabling use to me made of tire casings which would ordinarily be considered worthless and be thrown away.

An important object is the provision of means connected with the edges of the protective cover whereby to hold the same firmly upon the tire so as to prevent creeping, this means automatically taking up any looseness of the fit between the tire and the protector caused by partial deflation of the tire.

Another object is the provision of a cover of this character which is provided at its edges with hooks engaged by a chain and the chains being adapted to have associated therewith cross chains whereby to constitute a non-skid device.

An additional object is the provision of a cover of this character which will be simple and inexpensive, which may be quickly and easily applied, which may be adjusted to produce a very tight fit so as to exclude sound or water, and which will be a general improvement in the art.

With the above and other objects and advantages in view, the invention consists in the details of construction to be hereinafter more fully described and claimed, and illustrated in the accompanying drawings in which—

Figure 1 is a fragmentary side elevation showing my invention and showing the use of wire hoops equipped with turn-buckles at the edges of the cover, Figure 2 is a similar view showing the use of chains at the edges of the cover having interposed therein tension springs, Figure 3 is a view similar to Figure 2, showing cross chains connected with the side chains for constituting a non-skid device, Figure 4 is a cross sectional view taken through the securing hooks, and Figure 5 is a perspective view of one of the hooks prior to its engagement upon the cover.

Referring more particularly to the drawings, the letter A designates a tire casing upon which my protector is designed to be applied. In carrying out my invention I provide a cover 10 which is formed from an ordinary tire which has been rim cut and thereby rendered useless for ordinary use and from which the beads have been cut. Secured upon each side of the cover 10 adjacent the edges thereof, are hooks 11 each formed from a metal plate bent upon itself and held in place by means of prongs or tines 12 formed at the ends of the plate and driven into the tire. Engaged within the hooks at each side of the cover is a hoop or ring 13, formed, as shown in Figure 1, of stiff wire or a thin rod and interposed between the ends of these hooks are turn-buckles 14 by means of which the hoops may be contracted for drawing the cover 10 into over-close engagement with the tire casing A so as to prevent circumferential creeping and also to exclude water, sand or the like.

Referring to Figure 2, the structure is the same except that instead of using hoops formed of wire or rod, I make use of chains 15 which serve the same purpose and interposed between the ends of the chains are coil springs 16 which always hold the chains under tension and which will serve to contract the cover tightly onto the tire casing even though the tire becomes partially deflated.

As shown in Figure 3, these chains 15 are adapted to have connected therewith cross chains 17 which extend transversely of the tire and which serve to prevent skidding or slipping.

From the foregoing description and a study of the drawings it will be apparent that I have thus provided a simply constructed and easily applied protective cover for tires which is highly advantageous and economical as making use of damaged casings useless for ordinary service.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A protective device for tires comprising a cover disposed about a tire, and a plurality of retaining members secured upon the cover at each edge thereof, a flexible member disposed at each side of the cover and engaged within said retaining members, each of said retaining members being formed as a metallic plate of flexible material cut to define a plurality of tongues terminating in penetrating tines, said metallic plate being bent into substantially triangular shape with the tines of one set of tongues penetratingly engaging in the edge of the cover and the tines at the other sets of tongues engaging in the external surface of the cover adjacent the edge thereof.

2. A protective device for tires comprising a cover disposed about a tire, and a plurality of retaining members secured upon the cover at each edge thereof, a flexible member disposed at each side of the cover and engaged within said retaining members, each of said retaining means being formed as a metallic plate of flexible material cut to define a plurality of tongues terminating in penetrating tines, said metallic plate being bent into substantially triangular shape with the tines of one set of tongues penetratingly engaging in the edge of the cover and the tines at the other sets of tongues engaging in the external surface of the cover adjacent the edge thereof, one set of tongues being arranged in staggered relation to the other, and said tongues being furthermore formed on their lateral edges with other tines arranged in substantially parallel relation to the first named tines.

3. A protective device for tires comprising a cover disposed about a tire, a plurality of retaining means secured upon the cover at each edge thereof, and a flexible member disposed at each side of the cover and engaged within said retaining members, each of said retaining members being formed as a metallic plate cut to define a plurality of tongues terminating in tines and bent to define a loop for the engagement of said flexible member, the tines being forced into penetrating engagement with the cover at the edges thereof.

In testimony whereof I affix my signature.

WILLIAM C. BURT.